United States Patent
Santi

(10) Patent No.: US 9,464,930 B2
(45) Date of Patent: Oct. 11, 2016

(54) LOAD CELL FOR A FORKLIFT WITH A FIRST BRIDGE ARRANGEMENT CONSISTING OF STRAIN GAGES MOUNTED ON THE TOP AND BOTTOM EXTERNAL SURFACES, AND A SECOND BRIDGE ARRANGEMENT CONSISTING OF STRAIN GAGES MOUNTED INTERNAL TO A CENTRAL APERTURE

(71) Applicant: Larry D. Santi, Renton, WA (US)

(72) Inventor: Larry D. Santi, Renton, WA (US)

( * ) Notice: Subject to any disclaimer, the term of this patent is extended or adjusted under 35 U.S.C. 154(b) by 117 days.

(21) Appl. No.: 14/213,738

(22) Filed: Mar. 14, 2014

(65) Prior Publication Data

US 2014/0262551 A1  Sep. 18, 2014

Related U.S. Application Data

(60) Provisional application No. 61/799,001, filed on Mar. 15, 2013.

(51) Int. Cl.
G01L 1/22 (2006.01)
G01G 19/12 (2006.01)
G01G 19/08 (2006.01)

(52) U.S. Cl.
CPC ............ *G01G 19/12* (2013.01); *G01G 19/083* (2013.01); *G01L 1/2218* (2013.01)

(58) Field of Classification Search
CPC ...... G01G 19/12; G01G 19/083; G01L 1/22; G01L 1/2218
See application file for complete search history.

(56) References Cited

U.S. PATENT DOCUMENTS 2,866,059 A * 12/1958 Laimins ................ G01L 1/2243 177/211
2,935,213 A * 5/1960 Cellitti ....................... B66F 9/12 177/139
3,180,139 A * 4/1965 Soderholm ........... G01L 1/2243 338/5
3,724,575 A * 4/1973 Kutsay ................... G01G 3/142 177/211
3,927,560 A * 12/1975 Farr ....................... G01L 1/2243 177/211
4,326,424 A * 4/1982 Koenig ................. G01L 1/2243 73/862.474
4,421,186 A   12/1983 Bradley (Continued)

FOREIGN PATENT DOCUMENTS

JP        07260554 A   10/1995
JP     2007008614 A    1/2007
WO    2011/019265 A2    2/2011

OTHER PUBLICATIONS

Machine translation of Japanese application 2007-008614, Oct. 16, 2015.*

(Continued)

*Primary Examiner* — Randy W Gibson
(74) *Attorney, Agent, or Firm* — Seed IP Law Group PLLC

(57) ABSTRACT

A forklift scale to measure a load carried by a pair of forks of a forklift that includes a fork carriage to movably position the forks is provided along with a method to measure the load. The forklift scale may include a base coupleable to a fork carriage, a fork support system to receive the pair of forks, and a plurality of load cells configured to deform elastically in response to a load carried by the forks. The method to measure the load carried by the forks may include obtaining signals from the load cells and processing the signals to obtain a load value indicative of a load shared by the pair of forks. Other related forklift scales, load cells therefor and methods of measuring a forklift load are also provided.

16 Claims, 9 Drawing Sheets

(56) References Cited

U.S. PATENT DOCUMENTS

| | | | | |
|---|---|---|---|---|
| 4,657,097 A | * | 4/1987 | Griffen | G01L 1/2243 177/211 |
| 4,694,921 A | * | 9/1987 | Johnston | G01G 19/12 177/136 |
| 4,951,765 A | * | 8/1990 | Naito | G01G 3/1412 177/211 |
| 5,083,624 A | | 1/1992 | Reichow | |
| 5,230,393 A | * | 7/1993 | Mezey | B65F 3/08 177/139 |
| 5,824,963 A | * | 10/1998 | Bruns | G01G 19/083 177/1 |
| 5,837,945 A | * | 11/1998 | Cornwell | B65F 3/04 177/139 |
| 6,002,090 A | * | 12/1999 | Johnson | G01G 3/1404 177/136 |
| 6,363,798 B1 | * | 4/2002 | Gitis | G01L 1/2243 73/862.381 |
| 6,422,800 B1 | | 7/2002 | Reichow et al. | |
| 6,910,392 B2 | * | 6/2005 | Lockery | G01G 3/1414 73/862.627 |
| 8,353,388 B2 | | 1/2013 | Rice et al. | |
| 2010/0126781 A1 | * | 5/2010 | Lustenberger | G01G 19/08 177/136 |

OTHER PUBLICATIONS

Machine translation of Japanese application JP7-260554, Oct. 16, 2015.*

* cited by examiner

LOAD CELL FOR A FORKLIFT WITH A FIRST BRIDGE ARRANGEMENT CONSISTING OF STRAIN GAGES MOUNTED ON THE TOP AND BOTTOM EXTERNAL SURFACES, AND A SECOND BRIDGE ARRANGEMENT CONSISTING OF STRAIN GAGES MOUNTED INTERNAL TO A CENTRAL APERTURE

TECHNICAL FIELD

The present disclosure is directed to forklift devices, and more particularly, to forklift scales including therein a load cell that is used on a forklift device to accurately measure the applied forces from a load.

DESCRIPTION OF THE RELATED ART

In the field of forklift devices, objects that need to be transported are generally lifted via forks that are attached to the lift truck. Thus, weighing the objects for efficient and safe transport of such objects can be critical and is accomplished by utilization of force sensitive scales, which are capable of measuring the applied gravitational force resulting from the placement of an object or objects on the forks. One example that employs the use of scales in forklift devices is described in U.S. Pat. No. 4,421,186 to Bradley, which is incorporated herein by reference in its entirety.

Many known forklift scales, however, may suffer from various deficiencies, such as, for example, poor accuracy due to position sensitivity with respect to placement of the object or objects (hereinafter "load") on the forks. For example, as a load is placed closer to the tips of the forks, an end effect may be effectuated where the end loads and end moments add additional non-load forces, thereby reducing the accuracy of the measurement of the applied gravitational force due to placement of the object or objects. Attempts have been made previously to account for and reject these end effects and other non-load forces, including the systems and methods disclosed in U.S. Pat. No. 6,002,090 to Johnson, which is incorporated herein by reference in its entirety.

BRIEF SUMMARY

The embodiments described herein provide scale systems, load systems and related methods that are well adapted to measure loads in an accurate manner. Further, the scale systems and load cells are particularly adapted to compensate for end load and end moments that may result from the positioning of the load on the forks. Still further, the load cells are particularly suitable to serve as a substitute for existing forklift load cells that may be currently in use.

According to one embodiment, a forklift scale to measure a load carried by a pair of forks of a forklift that includes a fork carriage to movably position the forks may be summarized as including a base coupleable to the fork carriage; a fork support system to receive the pair of forks; and a plurality of load cells coupled between the base and the fork support system with a horizontal reference plane of each load cell being generally parallel to a load receiving surface of each fork. Each load cell may comprise a structural member having an aperture extending therethrough which defines at least one pair of offset strain gauge mounting surfaces that are parallel to the horizontal reference plane.

According to another embodiment, a load cell of a forklift scale for measuring at least a portion of a load carried by forks of a forklift may be summarized as included a structural member having a pair of external strain gauge mounting surfaces and having an aperture extending therethrough that defines at least one pair of internal strain gauge mounting surfaces that are parallel to a horizontal reference plane; and an arrangement of strain gauges to sense deformations at least at one or more locations on the at least one pair of offset strain gauge mounting surfaces. The arrangement may include a first bridge arrangement of strain gauges including a first pair of strain gauges mounted on one of the external strain gauge mounting surfaces and a second pair of strain gauges mounted on the other one of the external strain gauge mounting surfaces; and a second bridge arrangement of strain gauges including a first pair of strain gauges mounted on one of the internal strain gauge mounting surfaces and a second pair of strain gauges mounted on the other one of the internal strain gauge mounting surfaces.

According to still yet another embodiment, a method of measuring a load carried by a pair of forks of a forklift that includes a fork carriage to movably position the forks may be summarized as including obtaining signals from a respective arrangement of strain gauges of each of a plurality of load cells that are positioned between the fork carriage and the forks, at least some of the strain gauges of each respective arrangement of strain gauges of each load cell may be located on offset horizontal mounting surfaces defined by one or more apertures extending through a structural member thereof. The method may further include processing the signals to obtain a load value indicative of a load shared by the pair of forks. The method may further include determining a position of the load carried by the pair of forks using strain gauge signals and adjusting the load value indicative of the load shared by the pair of forks based on said determined position. The method may also include disabling or limiting movement of the forklift based on said determined position of the load.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and methods associated with forklift and forklift scale devices may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
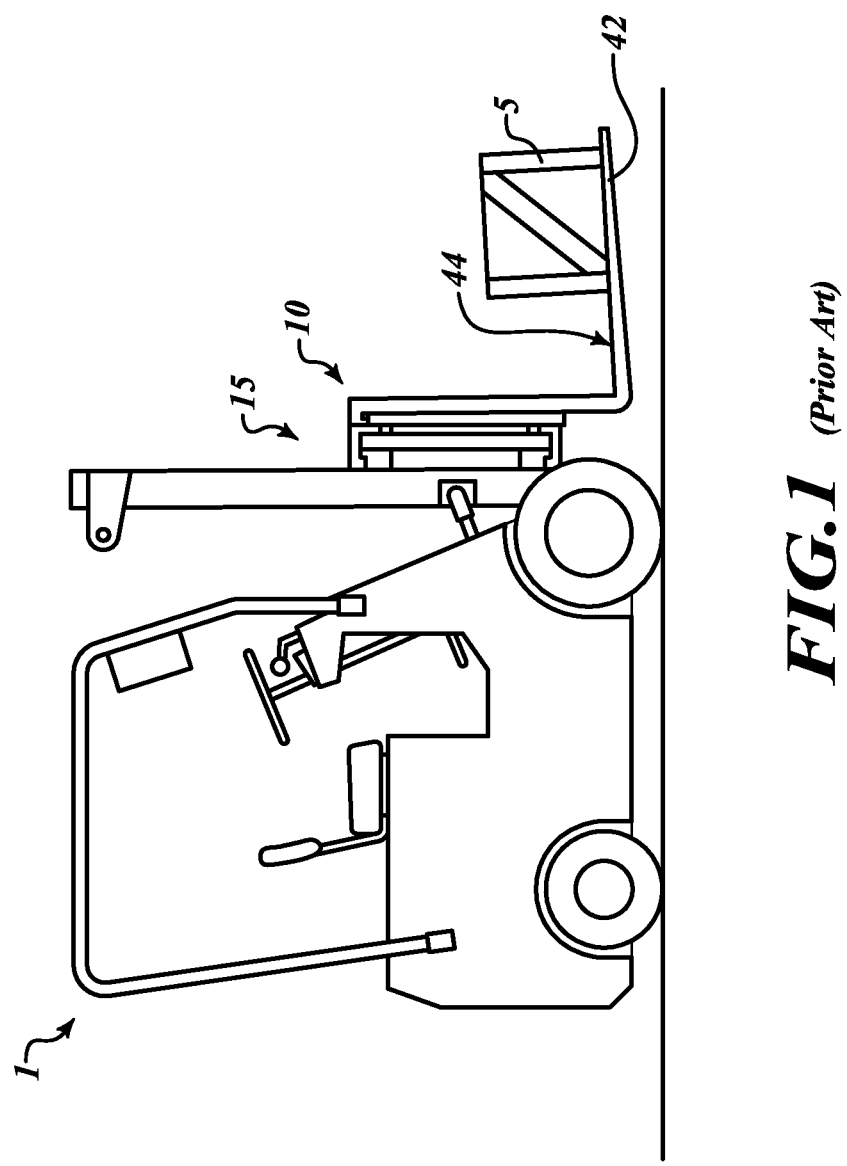
FIG. 1 is a side elevational view of a conventional lift truck with a forklift carriage, forklift scale and forks.

FIG. 1 illustrates a conventional lift truck 1 that includes a known forklift scale 10. An object 5 is shown positioned on a pair of forks 42 (only one visible) for raising and lowering thereof via a fork carriage 15. The forklift scale 10 is generally positioned between the forks 42 and the fork carriage 15, and is configured to sense or measure the weight of the object 5 being lifted and may communicate a signal indicative of the weight to the operator and/or disable certain functionality of the forklift 1 in response to the sensed load.

Figure 2:
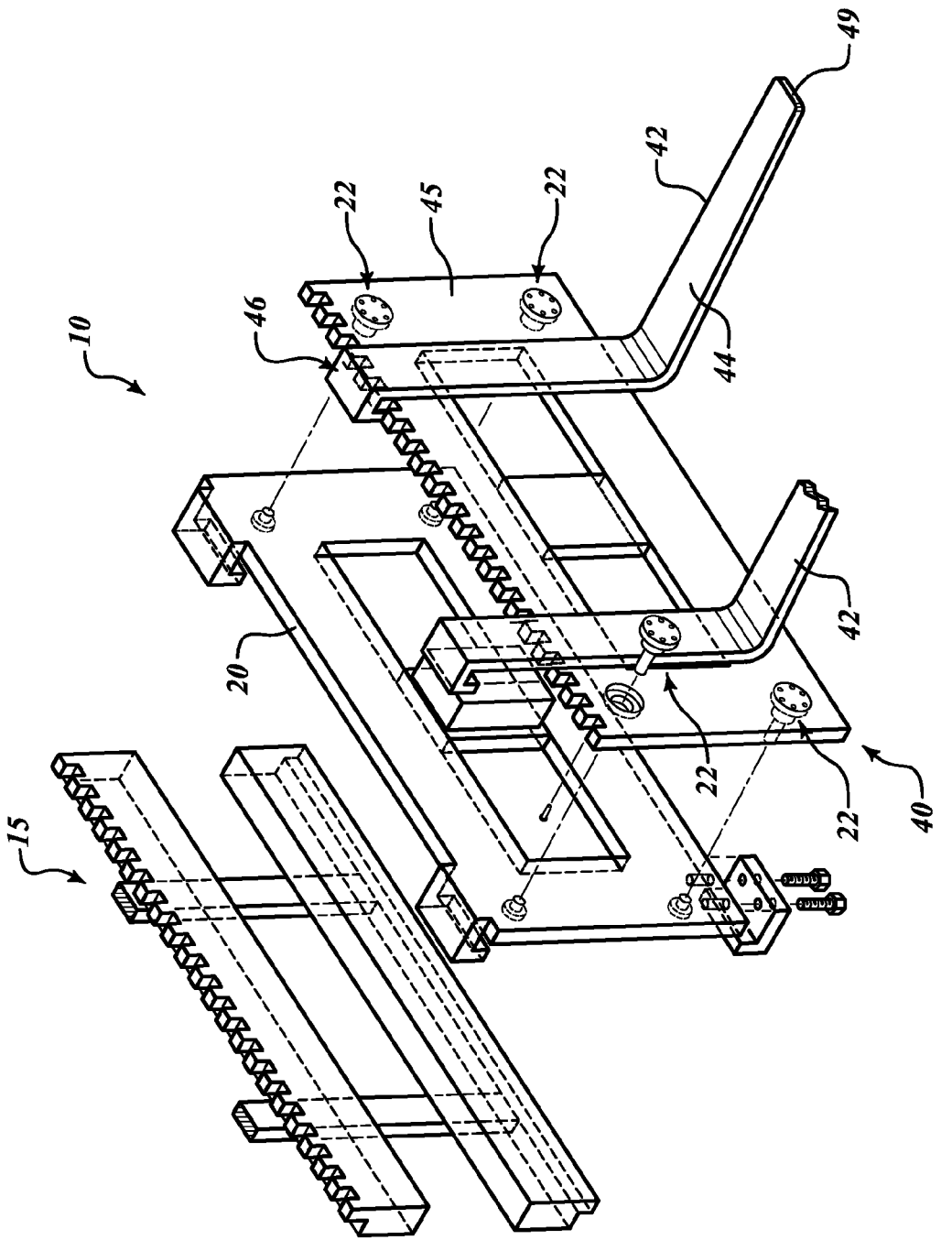
FIG. 2 is a partially exploded isometric view of the mechanical components of the conventional forklift carriage, forklift scale and forks shown in FIG. 1.

FIG. 2 illustrates the orientation of mechanical components of one type of conventional forklift scale 10. A base plate 20 of the scale 10 is configured to couple to the fork carriage 15 whereby, upon operation, the base plate 20 moves with the fork carriage 15 during a raising or lowering operation as well as optional tilting operations. The base plate 20 may be welded, fastened, coupled via an engagement mechanism, or may be integrally formed with the fork carriage 15. The base plate 20 is further coupled to a fork support system 40 via a plurality of intermediate load cells 22. The fork support system 40 is a structural arrangement 46 comprising a fork support plate 45 that is coupleable to the forks 42 in a conventional manner.

With continued reference to FIGS. 1 and 2, the object 5 to be lifted is positioned on a load-receiving surface 44 of the forks 42. The object 5 applies a gravitational force on the forks 42, which is reacted by the fork support system 40 and the base plate 20 through its connection via the load cells 22. The transfer of the gravitational force to the load cells 22 causes an elastic deformation of the load cells 22 as they are placed in bending and shear. The load cells 22 are configured to measure the bending and shear forces applied thereto and generate a signal indicative of the magnitude of the load.

As can be appreciated by a person of ordinary skill in the relevant art, the structural formation of a forklift scale 10 generally resembles a cantilevered beam formation. Thus, the position where the object 5 is placed along the load receiving surface 44 is particularly relevant, resulting in not just the vertical shear forces, which are the object of measurement, but also non-load effects, such as, for example, end moments. In order to improve the accuracy of load measurements, these non-load effects must be accounted for and rejected or compensated for in some manner.

Figure 3:
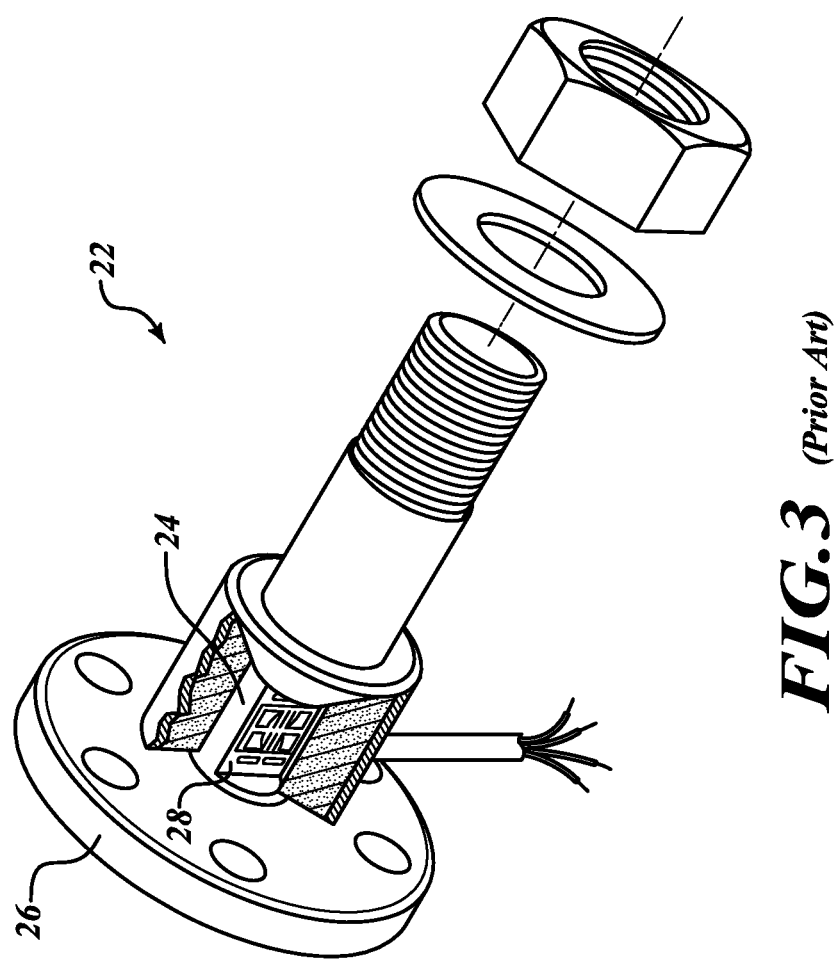
FIG. 3 is a partially cut away isometric view of a load sensor of the conventional forklift scale shown in FIGS. 1 and 2.

FIG. 3 illustrates a load cell 22 that is used with the known scale system shown in FIGS. 1 and 2. The load cell 22 includes a deformable member 24, which is a solid bar extending along the axis of a base flange 26. The deformable member 24 is a generally rectangular shaped beam that includes two opposing parallel side surfaces 28, upon which strain gauges are mounted to measure the strains in the deformable member 24 during operation.

Figure 4:
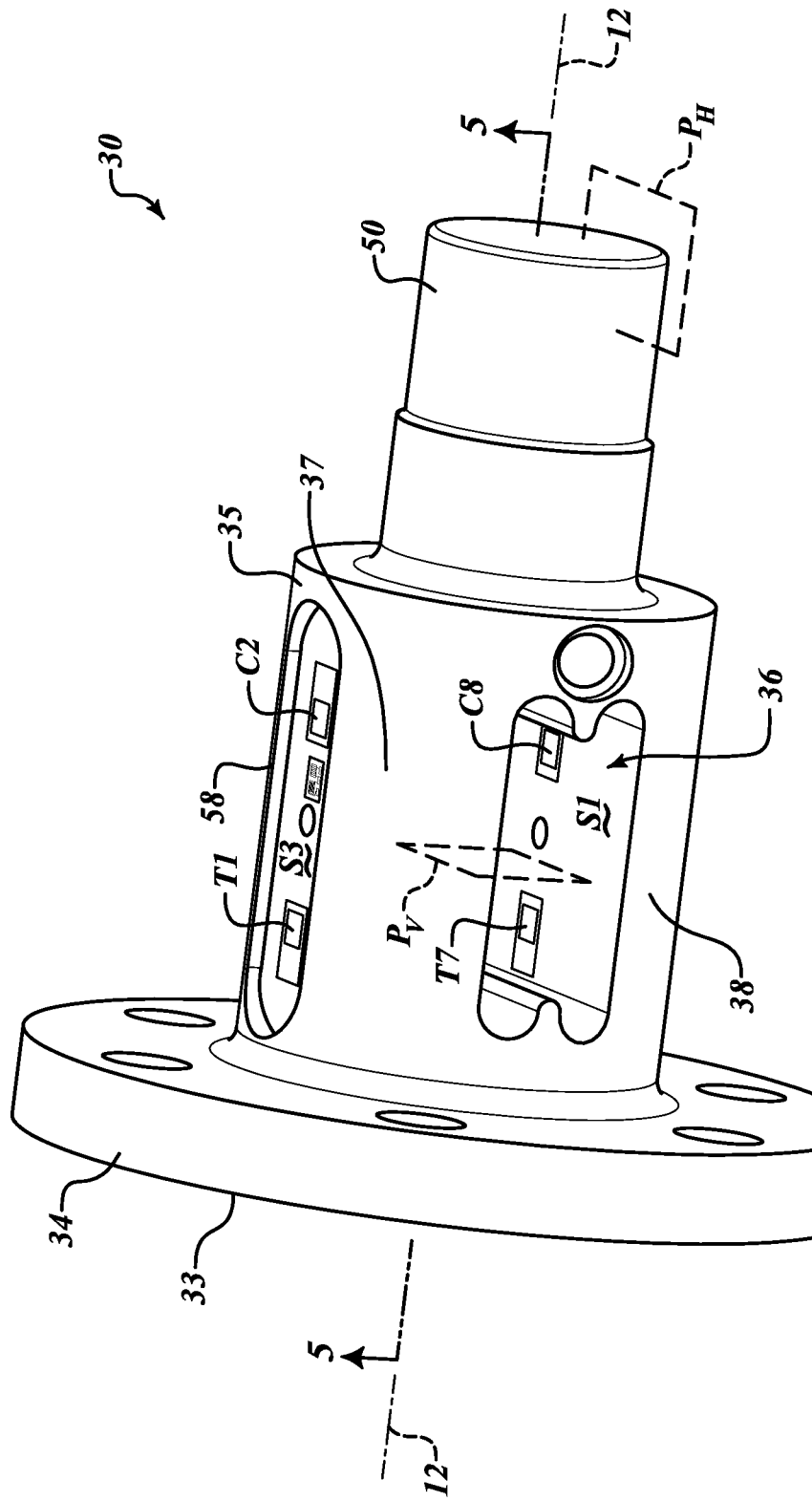
FIG. 4 is a skewed view of a load sensor, according to one embodiment.

FIG. 4 illustrates a load cell 30, according one embodiment, which may be provided in lieu of the load cells 22 shown in FIGS. 2 and 3 or may be integrated into other scale systems for forklifts or other lift systems. The load cell 30 comprises a neutral axis 12 extending in a longitudinal direction. The load cell 30 further comprises a flange 34, structural member 35, and a threaded shank portion 50. The flange 34, structural member 35, and the threaded shank portion 50 may be integrally formed. The flange 34 may be adapted to mount to the fork support plate 45 shown in FIG. 2 or other structures that may be configured to readily receive the forks 42 of the forklift 1. The threaded shank portion 50 may be configured to extend through the base plate 20 of the scale system shown in FIG. 2 or other structures. When used in lieu of load cell 22 in the forklift scale system 10 shown in FIGS. 1 and 2, the structural member 35 of the load cell 30 is positioned and oriented to elastically deform in response to a load of the object 5 on the forks 42. In some instances, the structural member 35 may be machined from a solid cylindrical section whose neutral axis may be coaxial or about coaxial with the neutral axis 12 of the load cell 30. In other instances, the structural member 35 may be cast or fabricated by other methods to include a generally cylindrical body and a plurality of strain gauge mounting surfaces S1-S4 as described in further detail elsewhere.

Figure 5:
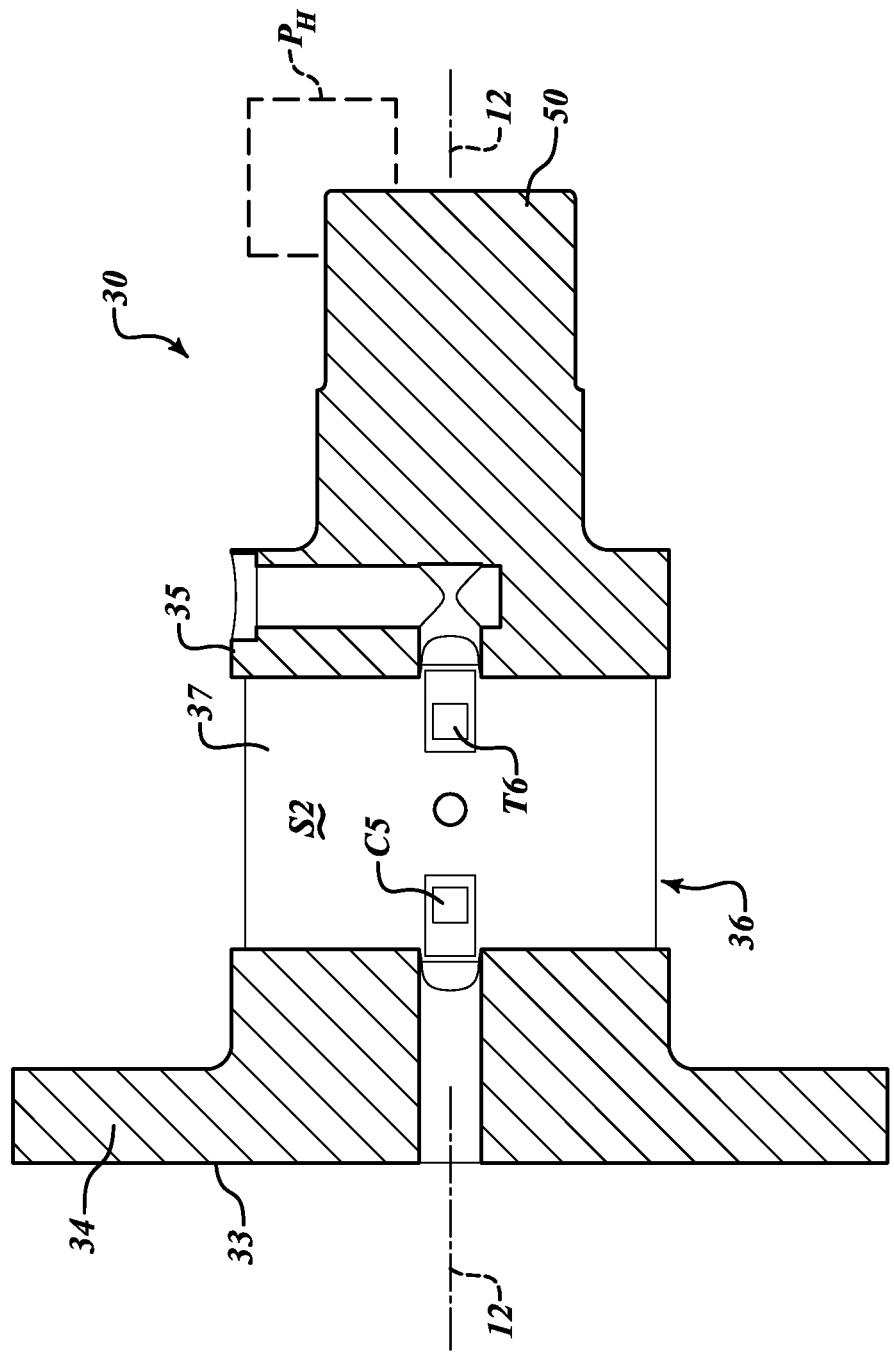
FIG. 5 is a cross-sectional view of the load sensor of FIG. 4 taken along line 5-5 in FIG. 4.
Figure 6:
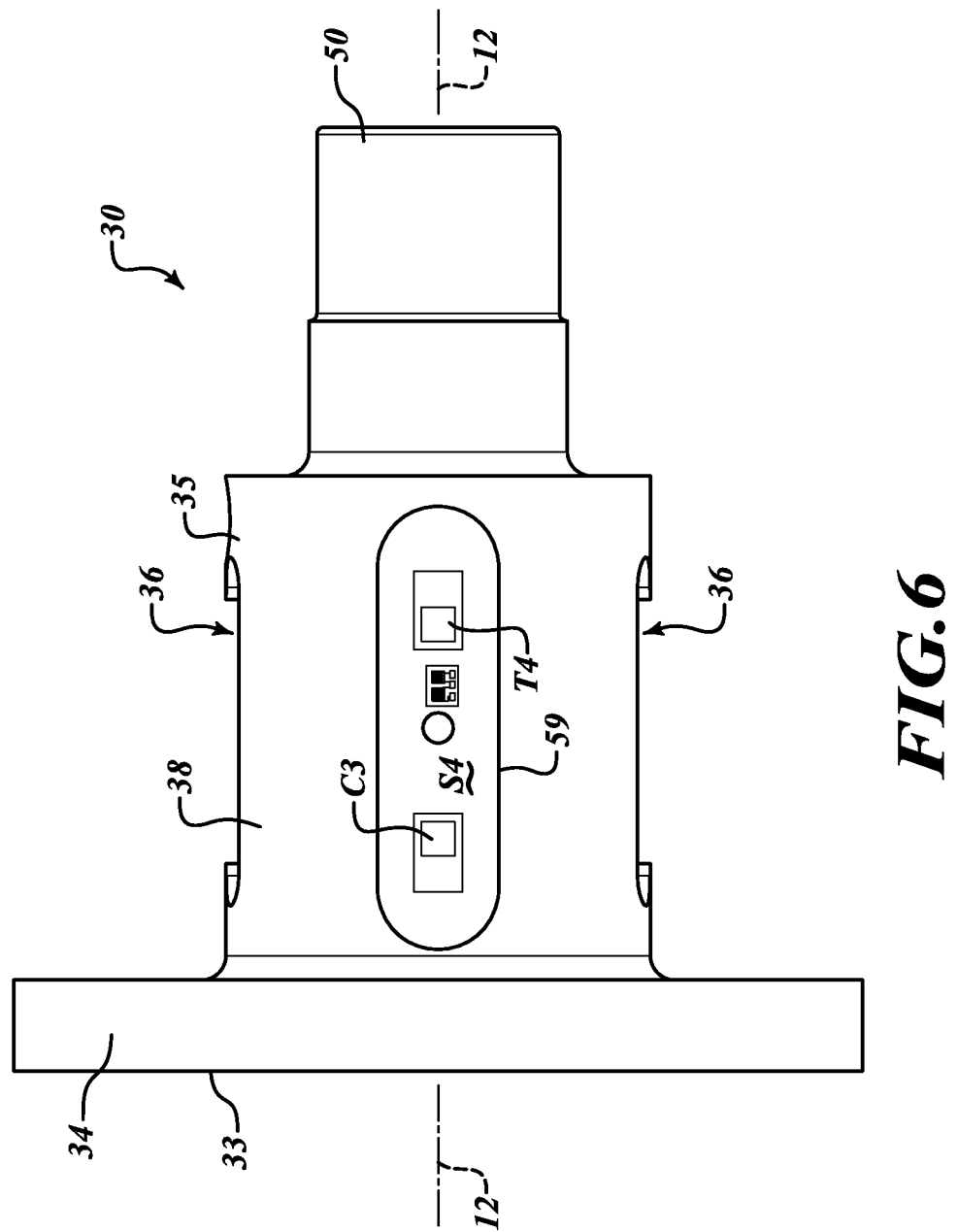
FIG. 6 is a bottom plan view of the load sensor of FIG. 4.
Figure 7:
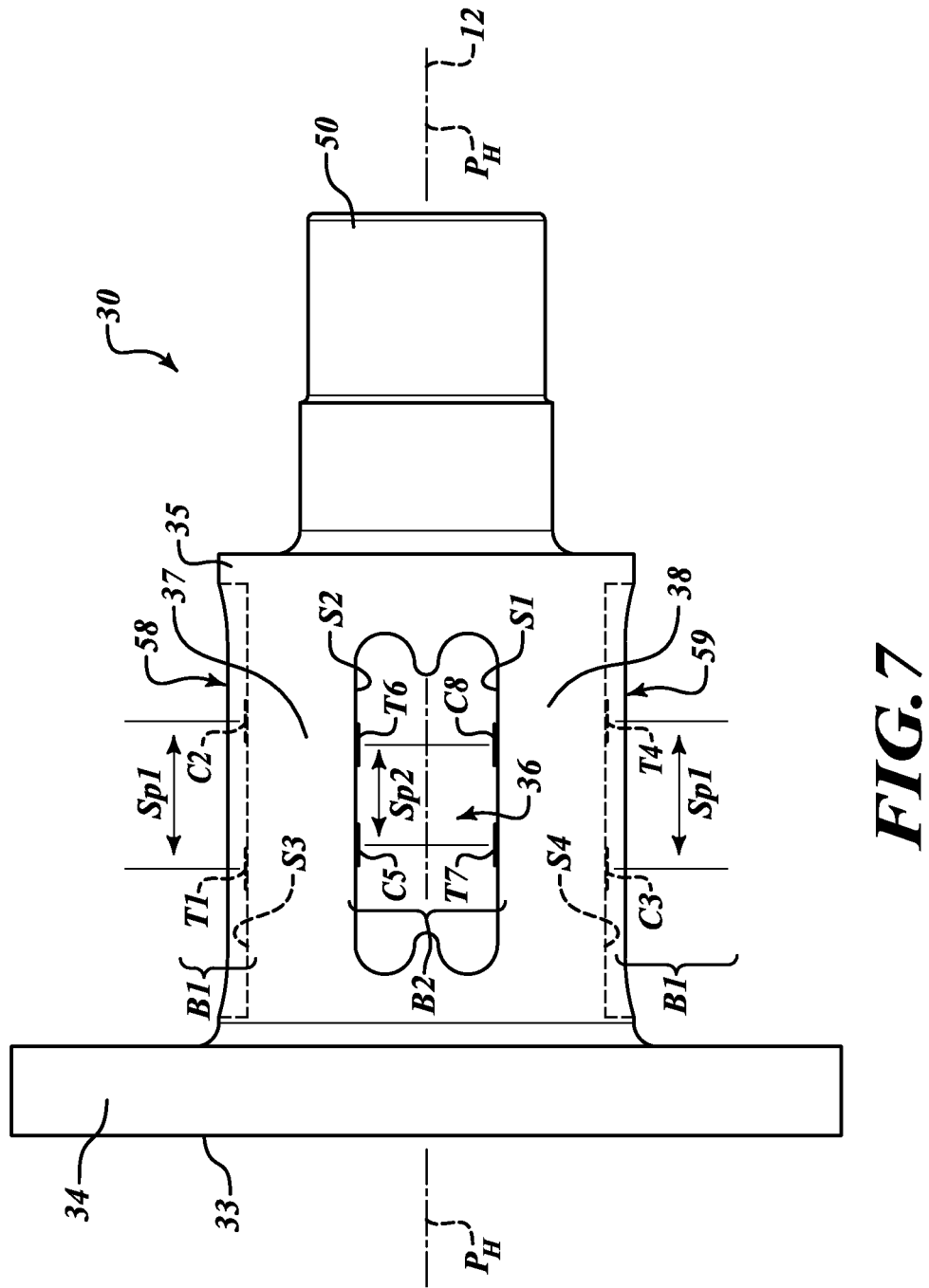
FIG. 7 is a side elevational view of the load sensor of FIG. 4.

FIGS. 5 and 6 show a cross-sectional view of the load cell 30 taken along the direction of the arrows 5-5 of FIG. 4 and a bottom elevational view of the load cell 30, respectively. FIG. 7 shows a side elevational view of the load cell 30. With reference to FIGS. 4 through 7, the structural member 35 includes an aperture 36 extending through the width of the structural member 35. The aperture 36 may define an upper thin-walled structure portion 37 and a lower thin-walled structure portion 38, as shown best in FIG. 7. The aperture 36 may be located at a suitable distance away from a rear surface 33 of the flange 34 along the neutral axis 12. Further, the length of the aperture 36 may be varied depending on the application and requirements, such as, for example, to facilitate additional strain gauges to be mounted thereon. In the embodiment shown in FIGS. 4 through 7, the aperture 36 is I-shaped and extends completely through the width of the structural member 35. However, in other embodiments, the aperture 36 may be oval shaped, T-shaped, or U-shaped, among other shapes, or may not extend through the entire width of the structural member 35.

With continued reference to FIGS. 4 through 7, each thin-walled structure 37, 38 may further define or include a pair of offset strain gauge mounting surfaces S1-S4. The offset strain gauge mounting surfaces S1-S4 may be parallel to each other and to a horizontal reference plane $P_H$ of the load cell 30. Each surface S1-S4 defines a surface upon which a strain gauge may be mounted in accordance with one or more embodiments described herein. Any commercially available strain gauge may be used and mounted using standard techniques, such as mounting via a mounting pad.

With reference to FIG. 4, and according to the illustrated embodiment of the load cell 30, the strain gauges may include a strain gauge T7 that is placed under tension in response to the applied load on the forks 42 and a strain gauge C8 that is placed under compression in response to the applied load on the forks 42. These strain gauges T7, C8 may be mounted on surface S1 within an interior of the load cell 30. With reference to FIG. 5, the strain gauges may also include a strain gauge T6 that is placed under tension in response to the applied load on the forks 42 and a strain gauge C5 that is placed under compression in response to the applied load on the forks 42. These strain gauges T6, C5 may be mounted on surface S2 that is also within an interior of the load cell 30.

With continued reference to FIGS. 4 through 7, the load cell 30 may also include a top surface S3 provided exterior of or recessed within the top thin-walled structure 37 and a bottom surface S4 provided exterior of or recessed within the bottom thin-walled structure 38 upon which strain gauges may be mounted. Advantageously, the surfaces S3 and S4 can be recessed within the body of the load cell and then covered with potting material to protect the same from harsh environments. In other embodiments, the surfaces S3 and S4 may be external surfaces of the load cell 30 (i.e., not recessed surfaces). In such cases, it may be beneficial to provide a cover or other protective device. In some instances, the top surface S3 and the bottom surface S4 may be parallel to each other and the horizontal reference plane $P_H$. In other instances, the surfaces S3 and S4 may be convexly curved. In some embodiments, the top surface S3 and the bottom surface S4 may include a respective oval shaped recess 58, 59 that is machined or otherwise formed within each of the respective thin-walled structures 37, 38. Again, however, in alternative embodiments, the surfaces may be surfaces that are not recessed within the load cell 30. In addition, the surfaces S3, S4 may include a different shape or surface profile, such as, for example, a convex profile.

With reference to FIG. 4, the top surface S3 includes a strain gauge T1 that is placed under tension in response to the applied load on the forks 42 and a strain gauge C2 that is placed under compression in response to the applied load on the forks 42. With reference to FIG. 6, the bottom surface S4 includes a strain gauge T4 that is placed under tension in response to the applied load on the forks 42 and a strain gauge C3 that is placed under compression in response to the applied load on the forks 42. In other embodiments, any combination of strain gauges may be mounted to one or more of the surfaces S1-S4. For example, one embodiment may include strain gauges mounted only on surface S1 and S2 and other embodiments may include strain gauges mounted on surfaces S1 and S4 only, or some other combination of the surfaces S1-S4.

With reference to FIG. 7, each load cell 30 may further include a plurality of strain gauges and, wherein, for each load cell 30, at least some of the strain gauges may be located on one or more of the thin-walled structural portions 37, 38 defined at least in part by the aperture 36. For example, a first bridge arrangement B1 may be attached to the external horizontal mounting surfaces S3, S4, as indicated by the locations labeled T1, C2, C3, T4 and a second bridge arrangement B2 of strain gauges may be attached to the internal horizontal mounting surfaces S1, S2, as indicated by the locations labeled C5, T6, T7, C8. The strain gauges located at positions T1, T4, T6, T7 may be placed in tension by the applied load on the forks 42 and the strain gauges located at positions C2, C3, C5, C8 may be placed in compression. The strain gauges at locations in the first bridge configuration B1 may be electrically connected in a Wheatstone bridge configuration to collectively generate a signal indicative of a portion of the load carried by the load cell 30 during operation. Similarly, the strain gauges at locations in the second bridge configuration B2 may be electrically connected in a Wheatstone bridge configuration to collectively generate a signal indicative of a portion of the load carried by the load cell 30 during operation. The signal generated by the first bridge arrangement B1 may be combined or analyzed together with a signal generated by the second bridge arrangement B2. Still further, the signals generated by the bridge arrangements of more than one load cell 30 may be combined or analyzed together to generate a combined load signal indicative of the load placed on the forks 42 during operation. For example, when providing a scale of the type shown in FIG. 2, four load cells may be positioned in respective quadrants between the fork support system 40 and the base plate 20. The load cells may collectively generate a load signal that is indicative of the load placed on the forks 42.

With reference to 7, advantageously, the strain gauges of each bridge arrangement B1, B2 may be configured such that the load cell 30 is substantially insensitive to the positioning of the load along a length of the forks 42. More particularly, the first bridge arrangement B1 may be arranged such that it experiences a signal change in a first direction with increasing distance of the load away from the load cell 30 and the second bridge arrangement B2 may be arranged such that it experiences a signal change in a second direction with increasing distance of the load from the load cell 30. The strain gauges of each bridge arrangement B1, B2 may be positioned such that a magnitude of the signal change exhibited by the first bridge arrangement B1 is about equal to a magnitude of the corresponding signal change exhibited by the second bridge arrangement B2 such that a summation of the magnitudes of the signals of the bridge arrangements remains generally constant with changing position of the load along the forks 42. In some instances, a scale factor or other calibration adjustment may be applied to one or more of the signals such that the summation of the magnitudes of the signals of the bridge arrangements B1, B2 remains generally constant with changing position of the load along the forks 42.

In some instances, the summation of the magnitudes of the signals of the bridge arrangements may deviate slightly with changing position of the load along the forks 42. For example, in some configurations a generally constant summation may be obtained with changing position of the load near a base of the forks 42 and near the tips of the forks 42 with changing load position in an intermediate range resulting in slight deviations such that the response throughout all load positions bows slightly from a straight line response. In such instances, it is advantageous to apply a correction factor or other adjustments to the readings based on load position to compensate for the non-linear response and obtain greater accuracy of load measurements. According to some embodiments, this may be achieved by taking a ratio of the bridge readings, which may increase substantially linearly as the distance of the center of gravity of the load increases from the load cell 30, to determine the position of the load relative to the forks 42 and hence load cell 30 with reasonable accuracy (e.g., within inches of the actual position of the center of gravity of the load). Knowing the center of gravity or approximate center of gravity of the load, it is then possible to adjust or correct the aforementioned non-linear response based on said load position. For example, a lookup table which correlates the load position to an appropriate corrective factor based on empirical data may be used to adjust or correct the aforementioned non-linear response. Moreover, this correction can be made automatically using an onboard computing system, which is not shown or described in further detail to avoid unnecessarily obscuring descriptions of the embodiments.

While knowing the center of gravity or approximate center of gravity is advantageous for enabling the functionality described above, it may also be beneficial to know the center of gravity or approximate center of gravity so that the capacity of the host forklift or other lift system can be de-rated appropriately as the position of the center of gravity of the load increases and results in a greater moment applied to the forks 42 or other lifting structure. In some instances, for example, the scale system may automatically disable lifting of a load when the center of gravity of the load is located such that it causes the load desired to be lifted to exceed the rated capacity of the forklift at that particular center of gravity position. For this purpose, the scale system may be communicatively coupled to a control system of the forklift or other host lifting system to disable lifting functionality, such as, for example, by disabling or limiting the movement of the lift system. An audible alarm, warning light or other indication may be provided when the load at a given center of gravity position exceeds the rated load at that position. Additionally, the control system of the forklift may evaluate the position of the center of gravity of the load and the magnitude of the load in conjunction with one or more signals or data indicative of the height and/or angle of the forks 42 to determine whether it is safe to operate the forklift under such conditions. Lifting, tilting or other movement of the forks 42 may be disabled or limited when exceeding a rated load or deviating from a predetermined safe operation condition.

As shown in FIG. 7, each of the strain gauges of the first bridge arrangement B1 at locations T1, C2, C3, T4 may be located further away from the central horizontal reference plane $P_H$ of the load cell 30 than each of strain gauges of the second bridge arrangement B2 at locations C5, T6, T7, C8, and a spread $Sp_1$ of each respective pair of strain gauges of the first bridge arrangement B1 may be greater than a spread $Sp_2$ of each respective pair of strain gauges of the second bridge arrangement B2. The difference in spread or lateral offset between the respective pairs of strain gauges may be determined experimentally to arrive at a suitable value that results in bridge arrangements B1, B2 that generally counteract sensitivities in each other to form a load cell that is particularly insensitive to the position of the load along the length of the forks 42.

In some embodiments, for example, the strain gauges of the first and the second bridge arrangements B1, B2 may be arranged such that a load value indicative of the load shared by the pair of forks is maintained below a threshold accuracy of about 0.5 percent irrespective of a position of the load along a length of the forks or other lift members. In other embodiments, the threshold accuracy may be better than 0.1 percent.

Figure 8:
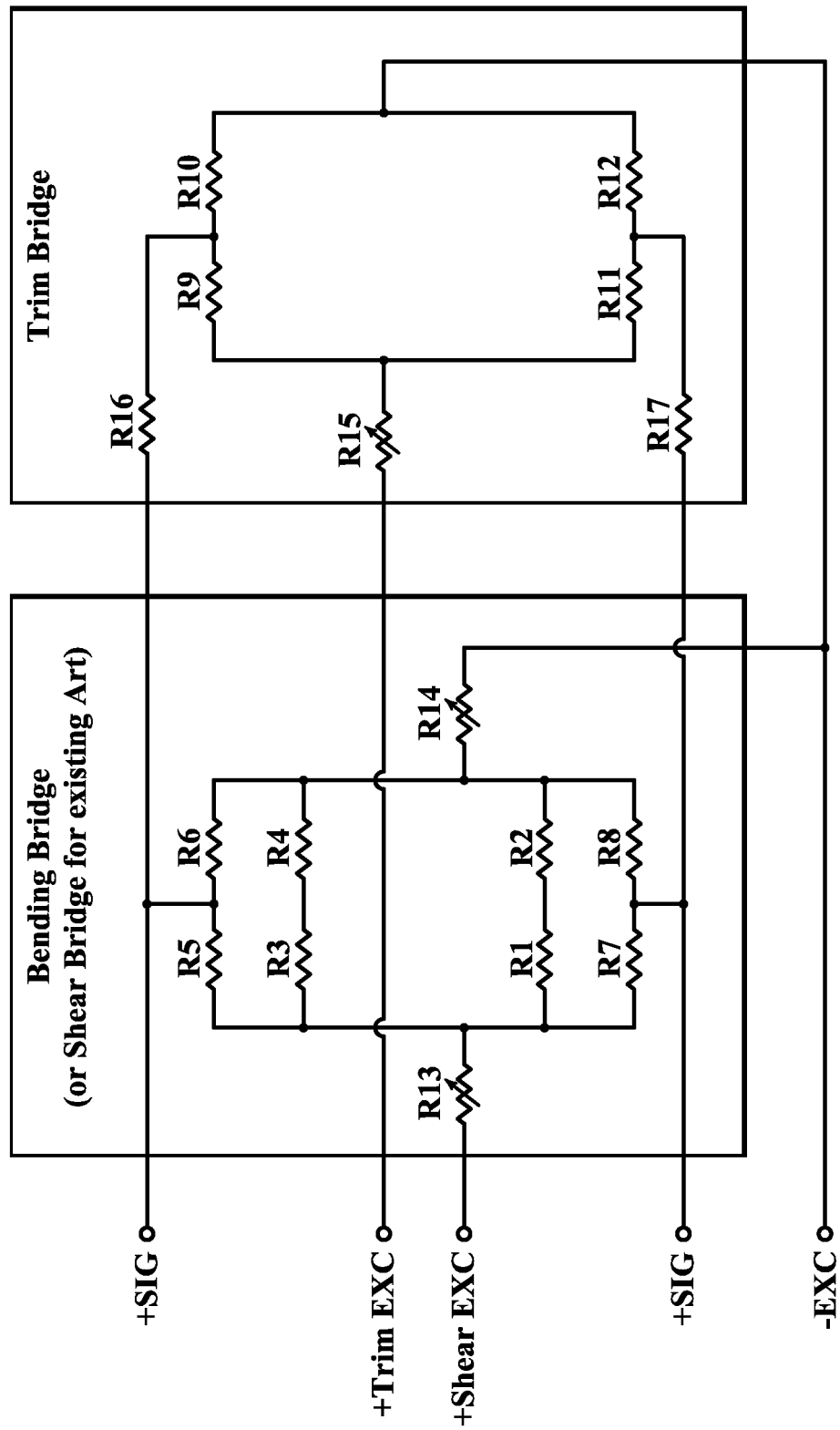
FIG. 8 shows an example embodiment of load cell circuitry having a trim bridge arrangement, which is usable with embodiments of the load cells and scale systems disclosed herein.

Further, the embodiments described herein are particularly adaptable to be supplemented with a trim bridge arrangement. A trim bridge arrangement is generally configured to sense end moments that may result from a cantilevered beam formation, where the signal generated from the end moments may be trimmed from the response of the primary bridge arrangement, thereby assisting in improving the accuracy of measurements. A trim bridge may be established in a Wheatstone configuration, where, for example, one strain gauge placed in tension and one strain gauge placed in compression may be mounted on the external horizontal mounting surface S3 and one strain gauge placed in tension and one strain gauge placed in compression may be mounted on the external horizontal mounting surface S4. The output signal of the trim bridge can thereafter be coupled in parallel with a primary bridge arrangement (comprising the first and second bridge arrangements discussed above) such that the signal generated from the output of the trim bridge arrangement may scale the output of the signal generated by the primary bridge arrangement to compensate for the end moments. FIG. 8 provides an example embodiment of load cell circuitry that includes a trim bridge arrangement. Although a trim bridge may be provided in some instances, it is appreciated that some embodiments of the load cells described herein may obviate the need for such a trim bridge. Rather, according to some embodiments, the load cells may include strain gauges arranged per the techniques described herein to provide accuracy within acceptable limits without a trim bridge.

Figure 9:
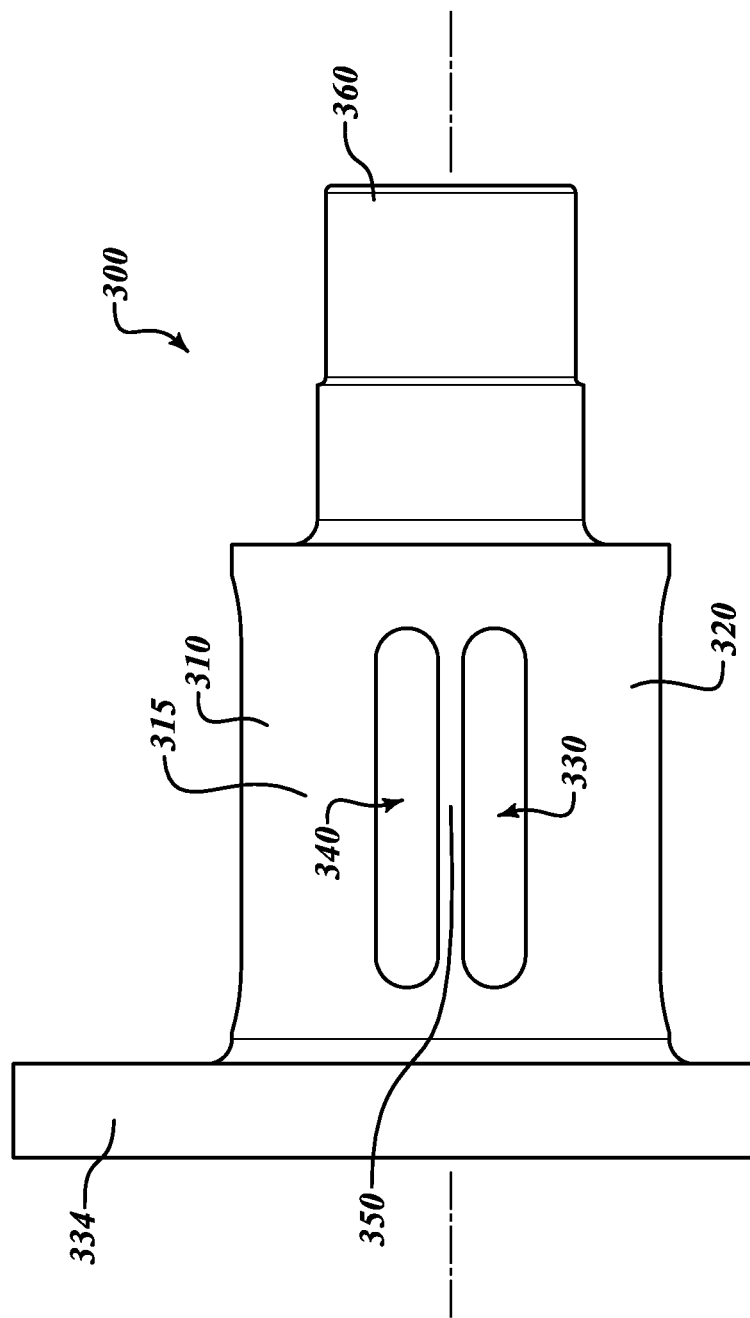
FIG. 9 is a side elevational view of a load sensor, according to another embodiment.

FIG. 9 illustrates an alternative embodiment of a load cell 300 shown in a side elevational view. The load cell 300 includes a flange 334, a threaded shank portion 360, and a structural member 310 similar to the aforementioned load cell 30. The structural member 310 includes a pair of apertures 330, 340 extending through the width of the structural member 310 which at least partially define a top thin-walled structure portion 315, a center thin-walled structure portion 350, and a bottom thin-walled structure portion 320. Each of the thin-walled structure portions 315, 320, and 350 may further define opposing surfaces upon which one or more strain gauges may be mounted. While the embodiment shown includes a pair of apertures 330, 340, other embodiments may include a three, four or more apertures, with each aperture at least partially defining a thin-walled structure adjacent thereto with respective surfaces thereof for mounting strain gauges in a variety of different arrangements.

The embodiments of the load cells described herein are particularly adaptable to substitute load cells in existing use, such as those shown in FIG. 3. For instance, flange 34, 334 of load cells 30, 300 (FIGS. 4 through 7 and 9) may be adapted to fit through an appropriate fork support system by matching the diameter and thickness of an appropriate receiving aperture in the fork support system. Similarly, the diameter of the threaded shank portions 50, 360 of the load cells 30, 300 may be adapted to suit existing apertures in the fork support systems and base plates, thereby coupling the fork support systems and the base plates. In addition, the thread diameter of the threaded shank portions 50, 360 may also be machined to adapt to the receiving fastening device or technique. For instance, the thread diameter of the threaded shank portions 50, 360 may be machined to adapt to the thread diameter of a tapped hole in the base plate. With respect to the electric circuitry, the bridge arrangements of strain gauges of the load cells 30, 300 described herein may also be adapted to match the electric circuitry of existing load cells, such as those shown in FIG. 3. A wiring diagram of an example embodiment of circuitry for a retrofit load cell to adapt the load cell to mimic the electric circuitry required for certain systems is provided herein in FIG. 8.

In accordance with the embodiments of the load cells and scale systems described herein, related methods of measuring a load carried by a pair of forks of a forklift are provided. For instance, in some embodiments, a method of measuring a load carried by a pair of forks of a forklift may be provided which includes: obtaining signals from a respective arrangement of strain gauges of each of a plurality of load cells that are positioned between a fork carriage and the forks, and processing the signals to obtain a load value indicative of a load shared by the pair of forks, wherein at least some of the strain gauges of each respective arrangement of strain gauges of each load cell are located on parallel offset horizontal mounting surfaces defined by one or more apertures extending through a structural member thereof.

Obtaining signals from the arrangement of strain gauges of each load cell may include obtaining signals from a first bridge arrangement of strain gauges including one pair of strain gauges mounted on one of a pair of external surfaces of the structural member and one pair of strain gauges mounted on the other one of the pair of external surfaces of the structural member, and a second bridge arrangement of strain gauges including one pair of strain gauges mounted on one of the parallel offset horizontal mounting surfaces and one pair of strain gauges mounted on the other one of the parallel offset horizontal mounting surfaces. The strain gauges of the first bridge arrangement and the second bridge arrangement may be arranged such that the load value indicative of the load shared by the pair of forks is maintained below a threshold accuracy of about 0.5 percent irrespective of a position of the load along a length of the forks, and wherein, for each load cell, the first bridge arrangement of strain gauges exhibits a signal change in a first direction when the load is positioned on the forks with increasing distance from the load cell and the second bridge arrangement of strain gauges exhibits a signal change in a second direction opposite the first direction when the load is positioned on the forks with increasing distance from the load cell. A magnitude of the signal change exhibited by the first bridge arrangement of strain gauges when the load is positioned on the forks with increasing distance from the load cell is about equal to a magnitude of the corresponding signal change exhibited by the second bridge arrangement of strain gauges such that a summation of the magnitudes of the signals of the first and the second bridge arrangements remains generally constant with changing position of the load along the forks. In other instances, a summation of the magnitudes of the signals of the first and the second bridge arrangements may deviate slightly with changing position of the load along the forks and may exhibit a slightly bowed, yet generally linear response.

The method may further include determining a position of the load carried by the pair of forks using the strain gauge signals, and adjusting the load value indicative of the load shared by the pair of forks based on said determined position. The method may also further include disabling or limiting movement of the forklift based on said determined position. Determining the position of the load may include using the strain gauge signals from the first bridge arrangement and the second bridge arrangement. In other instances, the method may include obtaining, for each load cell, a supplemental signal from a third bridge arrangement of strain gauges. It is appreciated, however, that a wide variety of strain gauge positions and orientations may be used in connection with the methods and scale systems described herein.

Although the embodiments shown and described herein have been discussed in the context of use with conventional forklifts, it is appreciated that embodiments of the scales, load cells and related methods disclosed herein may be suitable for a wide range of equipment that is configured to manipulate a cantilevered load on one or more fork or fork-like lift members. For example, embodiments described herein may be applied to waste management vehicles equipped with lift systems for waste bins. In addition, as mentioned above, the scale systems and load cells may be scaled to provide a solution for a wide range of forklifts, including forklift trucks with load ratings from 5,000 lbs. up to and beyond 30 tons. In addition, it will be appreciated that the systems described herein may include a pitch and roll inclinometer to sense a pitch and roll of the fork carriage 15 (and hence the load cells 30) and adjust load signals and calculations accordingly. Still further, although it is contemplated that the load cells 30 described herein may be particularly well suited for use in connection with the scale arrangement shown in FIG. 2 as replacements of the load cells 22 thereof, it is also appreciated that the load cells 30 described herein may be used in connection with a wide variety of other structural arrangements and applications. For example, instead of a scale system that extends between and collectively supports both forks 42, a scale system may be provided in which a first pair of the load cells 30 (e.g., left side pair) form a portion of a first scale unit, and in which a second pair of the load cells 30 (e.g., right side pair) form a portion of a second scale unit that is separate from the first scale unit, with each scale unit separately supporting a respective fork 42 on a common carriage 15 of a conventional lift truck 1 or the like.

Moreover, aspects of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Provisional Application Ser. No. 61/799,001 filed Mar. 15, 2013, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A load cell of a forklift scale for measuring at least a portion of a load carried by forks of a forklift, the load cell comprising:
    a structural member having a pair of external strain gauge mounting surfaces and having an aperture extending therethrough that defines at least one pair of internal strain gauge mounting surfaces that are parallel to a horizontal reference plane; and
    an arrangement of strain gauges to sense deformations at least at one or more locations on the at least one pair of offset strain gauge mounting surfaces, the arrangement including
        a first bridge arrangement of strain gauges including one pair of strain gauges mounted on one of the external strain gauge mounting surfaces and one pair of strain gauges mounted on the other one of the external strain gauge mounting surfaces; and
        a second bridge arrangement of strain gauges including one pair of strain gauges mounted on one of the internal strain gauge mounting surfaces and one pair of strain gauges mounted on the other one of the internal strain gauge mounting surfaces.

2. The load cell of claim 1 wherein the first bridge arrangement and the second bridge arrangement are connected in parallel to at least partially counteract respective signal changes of each set when the load is repositioned along a length of the fork.

3. The load cell of claim 1 wherein the aperture defines an upper strain gauge mounting surface and a lower strain gauge mounting surface that each include a surface normal directed toward the horizontal reference plane.

4. The load cell of claim 1 wherein the aperture is I-shaped and extends completely through a width of the structural member.

5. The load cell of claim 1 wherein the aperture extends through a width of the structural member to define at least one thin-walled structural portion adjacent to the aperture.

6. The load cell of claim 1 wherein the structural member includes at least one thin-walled structural portion with opposing surfaces that are generally parallel to the horizontal reference plane.

7. The load cell of claim 1 wherein the structural member of each load cell includes a plurality of distinct apertures extending through a width therewith in series to define at least one thin-walled structural portion between the apertures.

8. The load cell of claim 1 wherein at least some of the strain gauges of the first bridge arrangement are positioned generally opposite of corresponding strain gauges of the second bridge arrangement relative to the horizontal reference plane.

9. The load cell of claim 1 wherein at least some of the strain gauges of the first bridge arrangement and corresponding strain gauges of the second bridge arraignment are located about equidistant from the horizontal reference plane.

10. The load cell of claim 1 wherein a first set of strain gauges of the first bridge arrangement is located further away from the horizontal reference plane than a first set of strain gauges of the second bridge arrangement, and wherein a spread of the first set of strain gauges of the first bridge arrangement is greater than a spread of the first set of the strain gauges of the second bridge arrangement.

11. The load cell of claim 1 wherein the first bridge arrangement is configured to exhibit a signal increase when, during use, a load is positioned on the forks with increasing distance from the load cell, and wherein the second bridge arrangement is configured to exhibit a signal decrease when, during use, the load is positioned on the forks with increasing distance from the load cell.

12. The load cell of claim 11 wherein the arrangement of strain gauges is configured such that a magnitude of the signal increase exhibited by the first bridge arrangement when the load is positioned on the forks with increasing distance from the load cell is about equal to a magnitude of the corresponding signal decrease exhibited by the second bridge arrangement.

13. The load cell of claim 12 wherein the arrangement of strain gauges is configured such that a summation of the magnitudes of the signals of the first bridge arrangement and the second bridge arrangement remains generally constant with changing position of the load along the forks.

14. A method of measuring a load carried by a pair of forks of a forklift that includes a fork carriage to movably position the forks, the method comprising:
    obtaining signals from a respective arrangement of strain gauges of each of a plurality of load cells that are positioned between the fork carriage and the forks, at least some of the strain gauges of each respective arrangement of strain gauges of each load cell being located on parallel offset horizontal mounting surfaces defined by one or more apertures extending through a structural member thereof; and
    processing the signals to obtain a load value indicative of a load shared by the pair of forks,
    wherein obtaining the signals from the arrangement of strain gauges of each load cell includes
        obtaining signals from a first bridge arrangement of strain gauges including one pair of strain gauges mounted on one of a pair of external surfaces of the structural member and one pair of strain gauges mounted on the other one of the pair of external surfaces of the structural member; and
        obtaining signals from a second bridge arrangement of strain gauges including one pair of strain gauges mounted on one of the parallel offset horizontal mounting surfaces and one pair of strain gauges mounted on the other one of the parallel offset horizontal mounting surfaces.

15. The method of claim 14 wherein the strain gauges of the first bridge arrangement and the second bridge arrangement are arranged such that the load value indicative of the load shared by the pair of forks is maintained below a threshold accuracy of about 0.5 percent irrespective of a position of the load along a length of the forks, and wherein, for each load cell, the first bridge arrangement of strain gauges exhibits a signal change in a first direction when the load is positioned on the forks with increasing distance from the load cell and the second bridge arrangement of strain gauges exhibits a signal change in a second direction opposite the first direction when the load is positioned on the forks with increasing distance from the load cell.

16. The method of claim 15 wherein a magnitude of the signal change exhibited by the first bridge arrangement of strain gauges when the load is positioned on the forks with increasing distance from the load cell is about equal to a magnitude of the corresponding signal change exhibited by the second bridge arrangement of strain gauges such that a summation of the magnitudes of the signals of the first and the second bridge arrangements remains generally constant with changing position of the load along the forks.

* * * * *